United States Patent
Wang

(10) Patent No.: US 11,167,644 B2
(45) Date of Patent: Nov. 9, 2021

(54) METHOD AND SYSTEM FOR NOTIFICATION OF AN ACTIVE SHORT CIRCUIT CONDITION IN AN ELECTRIC MOTOR OF A HYBRID ELECTRIC VEHICLE

(71) Applicant: Lear Corporation, Southfield, MI (US)

(72) Inventor: Xiaoyan Wang, Troy, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 16/778,827

(22) Filed: Jan. 31, 2020

(65) Prior Publication Data

US 2021/0237579 A1    Aug. 5, 2021

(51) Int. Cl.
| | |
|---|---|
| *B60K 6/52* | (2007.10) |
| *B60L 3/00* | (2019.01) |
| *H02P 29/024* | (2016.01) |
| *H02H 7/08* | (2006.01) |
| *H02P 27/06* | (2006.01) |

(52) U.S. Cl.
CPC ............ *B60L 3/0061* (2013.01); *H02H 7/08* (2013.01); *H02P 27/06* (2013.01); *H02P 29/0241* (2016.02)

(58) Field of Classification Search
CPC .... B60L 3/0061; H02P 29/0241; H02P 27/06; H02H 7/08; B60K 6/52; H02K 21/14
See application file for complete search history.

(56) References Cited

U.S. PATENT DOCUMENTS

| | | |
|---|---|---|
| 6,422,331 B1 | 7/2002 | Ochiai et al. |
| 6,958,586 B2 | 10/2005 | Tanimoto |
| (Continued) | | |

FOREIGN PATENT DOCUMENTS

| | | |
|---|---|---|
| EP | 2727235 B1 | 3/2015 |
| EP | 2846454 A1 | 3/2015 |
| (Continued) | | |

OTHER PUBLICATIONS

U.S. Appl. No. 16/778,842, Notice of Allowance, dated Jun. 9, 2021, 12 pages.

(Continued)

*Primary Examiner* — Cortez M Cook
(74) *Attorney, Agent, or Firm* — Brooks Kushman P.C.

(57) ABSTRACT

A system for active short circuit notification in an electric motor of a hybrid electric vehicle including a traction battery, an internal combustion engine in mechanical communication with the motor, and a propulsion system driven by the motor or engine. The system includes an inverter and inverter controller to generate signals to operate inverter switches to produce AC for the motor or DC for battery charging. In response to motor speed exceeding a threshold, the inverter controller is configured to generate signals to operate the switches to produce an active short circuit in the motor to prevent battery overcharging. In response to an active short circuit, the inverter controller is configured to transmit a notification signal to a vehicle controller configured to generate an engine stop control signal operative to stop the engine to reduce current circulation between the inverter and motor caused by the active short circuit.

20 Claims, 2 Drawing Sheets

(56) References Cited

U.S. PATENT DOCUMENTS

| | | |
|---|---|---|
| 7,391,180 B2 | 6/2008 | Armiroli et al. |
| 7,960,930 B2 | 6/2011 | Sato |
| 8,207,692 B2 | 6/2012 | Holmberg et al. |
| 8,594,873 B2 | 11/2013 | Kimura et al. |
| 8,666,579 B2 | 3/2014 | Akutsu et al. |
| 9,186,998 B2 | 11/2015 | Wald et al. |
| 9,302,589 B2 | 4/2016 | Schneider et al. |
| 9,438,157 B2 | 9/2016 | Adam et al. |
| 9,621,099 B1 | 4/2017 | Namudur et al. |
| 9,673,744 B2 | 6/2017 | Eberlein et al. |
| 9,698,716 B2 | 7/2017 | Tobari et al. |
| 10,295,414 B2 | 5/2019 | Karl |
| 10,351,002 B2 | 7/2019 | Saha et al. |
| 2005/0093496 A1* | 5/2005 | Tokunou ............ B60K 6/52 318/375 |
| 2009/0121668 A1 | 5/2009 | West et al. |
| 2015/0314685 A1 | 11/2015 | Imamura et al. |
| 2015/0377162 A1* | 12/2015 | Kamioka ............ F02D 41/042 701/112 |
| 2021/0237603 A1 | 8/2021 | Wang |
| 2021/0242705 A1 | 8/2021 | Wang |

FOREIGN PATENT DOCUMENTS

| | | | |
|---|---|---|---|
| JP | 2006288051 A | * 10/2006 | .......... B60L 15/2009 |
| WO | 2018228741 A1 | 12/2018 | |
| WO | 2019170495 A1 | 9/2019 | |

OTHER PUBLICATIONS

U.S. Appl. No. 16/778,851, filed Jan. 31, 2020, 22 pages.
U.S. Appl. No. 16/778,842, filed Jan. 31, 2020, 21 pages.
Non-Final Rejection for U.S. Appl. No. 16/778,827, dated Sep. 7, 2021.

* cited by examiner

METHOD AND SYSTEM FOR NOTIFICATION OF AN ACTIVE SHORT CIRCUIT CONDITION IN AN ELECTRIC MOTOR OF A HYBRID ELECTRIC VEHICLE

TECHNICAL FIELD

The following relates to a method and system for notification of an active short circuit condition in an electric motor of a hybrid electric vehicle including a traction battery.

BACKGROUND

A hybrid electric vehicle (HEV) includes an electric motor and a high-voltage (HV) (e.g., 48V, 300V) direct current (DC) traction battery to provide power for the electric motor to drive a propulsion system of the vehicle. An HEV also includes an inverter having multiple switches, such as Insulated-Gate Bipolar Transistors (IGBTs), in electrical communication with the electric motor and the HV DC traction battery, as well as an inverter controller in electrical communication with the inverter. The electric motor, inverter, and inverter controller are typically part of a Belt-integrated Starter Generator (BiSG) system in which the shaft of the electric motor is provided in mechanical communication with a shaft of an internal combustion engine of the vehicle through a belt.

The BiSG system is configured for operation in different modes, including a motoring mode in which the inverter controller may control the inverter to operate the electric motor as a starter to assist engine start during cranking of the internal combustion engine. In such a motoring mode, the inverter controller may alternatively operate the electric motor to drive the vehicle propulsion system. More specifically, in the motoring mode, the inverter controller is configured to generate driver signals to operate the inverter switches to convert direct current (DC) received from the HV DC traction battery into three-phase alternating current (AC) for the electric motor to drive the vehicle propulsion system.

The BiSG system is also configured for operation in a generating mode in which the inverter controller controls the inverter to operate the electric motor as a charger to provide current to the HV DC traction battery. More specifically, in the generating mode, the inverter controller is configured to generate driver signals to operate the inverter switches to convert three-phase alternating current (AC) received from the electric motor operating as a generator into direct current (DC) for charging the HV DC traction battery.

In that regard, an active short circuit condition may be utilized as a safety method to prevent the HV DC traction battery from being damaged due to overcharging. More specifically, the inverter controller may be configured to produce an active short circuit in the electric motor when the speed of the electric motor becomes high enough to allow free-wheeling current flowing from the electric motor to the HV DC traction battery.

However, an active short circuit condition generates current circulating between the electric motor windings and the IGBT switches of the inverter. If the electric motor continues to rotate, such circulating current will eventually cause damage to the electric motor and the IGBT switches of the inverter due to overheating.

A need therefore exists for a method and system for notification of an active short circuit condition in an electric motor of an HEV including an HV DC traction battery. Such a method and system would inform or notify a vehicle controller of the active short circuit condition, wherein the vehicle controller is configured to generate an engine stop control signal after receipt of the active short circuit notification to stop the internal combustion engine and thereby reduce circulation of electric current between the electric motor and inverter caused by the active short circuit condition.

SUMMARY

According to one non-limiting exemplary embodiment described herein, a method is provided for notification of an active short circuit condition in an electric motor of a hybrid electric vehicle including a traction battery, an internal combustion engine in mechanical communication with the electric motor, a vehicle propulsion system configured to be driven by the electric motor or the internal combustion engine, an inverter having a plurality of switches in electrical communication with the electric motor and the traction battery, and an inverter controller in electrical communication with the inverter and configured to generate driver signals to operate the plurality of switches of the inverter to produce three-phase alternating current for the electric motor to drive the vehicle propulsion system or to produce direct current for charging the traction battery. The method comprises comparing a monitored speed of the electric motor to a speed threshold. The method further comprises generating, in response to the monitored speed exceeding the threshold, driver signals to operate the plurality of switches to produce an active short circuit condition in the electric motor to prevent overcharging of the traction battery, and transmitting, in response to an active short circuit condition in the electric motor, an active short circuit notification signal to a vehicle controller configured to generate an engine stop control signal operative to stop the internal combustion engine and thereby reduce circulation of electric current between the inverter and the electric motor caused by the active short circuit condition.

According to another non-limiting exemplary embodiment described herein, a system is provided for notification of an active short circuit condition in an electric motor of a hybrid electric vehicle including a traction battery, an internal combustion engine in mechanical communication with the electric motor, and a vehicle propulsion system configured to be driven by the electric motor or the internal combustion engine. The system comprises an inverter comprising a plurality of switches, wherein the inverter is configured to be provided in electrical communication with the electric motor and the traction battery, and an inverter controller configured to be provided in electrical communication with the inverter and to generate driver signals to operate the plurality of switches of the inverter to produce three-phase alternating current for the electric motor to drive the vehicle propulsion system or to produce direct current for charging the traction battery. The inverter controller is configured to compare a monitored speed of the electric motor to a speed threshold, and in response to the monitored speed exceeding the threshold, generate driver signals to operate the plurality of switches to produce an active short circuit condition in the electric motor to prevent overcharging of the traction battery. In response to an active short circuit condition in the electric motor, the inverter controller is further configured to transmit an active short circuit notification signal to a vehicle controller configured to generate an engine stop control signal operative to stop the internal combustion engine and thereby reduce circulation of electric current between the inverter and the electric motor caused by the active short circuit condition.

According to still another non-limiting exemplary embodiment described herein, a non-transitory computer readable storage medium is provided having stored computer executable instructions for notification of an active short circuit condition in an electric motor of a hybrid electric vehicle including a traction battery, an internal combustion engine in mechanical communication with the electric motor, a vehicle propulsion system configured to be driven by the electric motor or the internal combustion engine, an inverter having a plurality of switches in electrical communication with the electric motor and the traction battery, and an inverter controller in electrical communication with the inverter and configured to generate driver signals to operate the plurality of switches of the inverter to produce three-phase alternating current for the electric motor to drive the vehicle propulsion system or to produce direct current for charging the traction battery. Execution of the instructions causes the inverter controller to compare a monitored speed of the electric motor to a speed threshold, generate, in response to the monitored speed exceeding the threshold, driver signals to operate the plurality of switches to produce an active short circuit condition in the electric motor to prevent overcharging of the traction battery, and transmit, in response to an active short circuit condition in the electric motor, an active short circuit notification signal to a vehicle controller configured to generate an engine stop control signal operative to stop the internal combustion engine and thereby reduce circulation of electric current between the inverter and the electric motor caused by the active short circuit condition.

A detailed description of these and other non-limiting exemplary embodiments of a method and system for notification of an active short circuit condition in an electric motor of a hybrid electric vehicle including a traction battery are set forth below together with the accompanying drawings.

DETAILED DESCRIPTION

Figure 1:
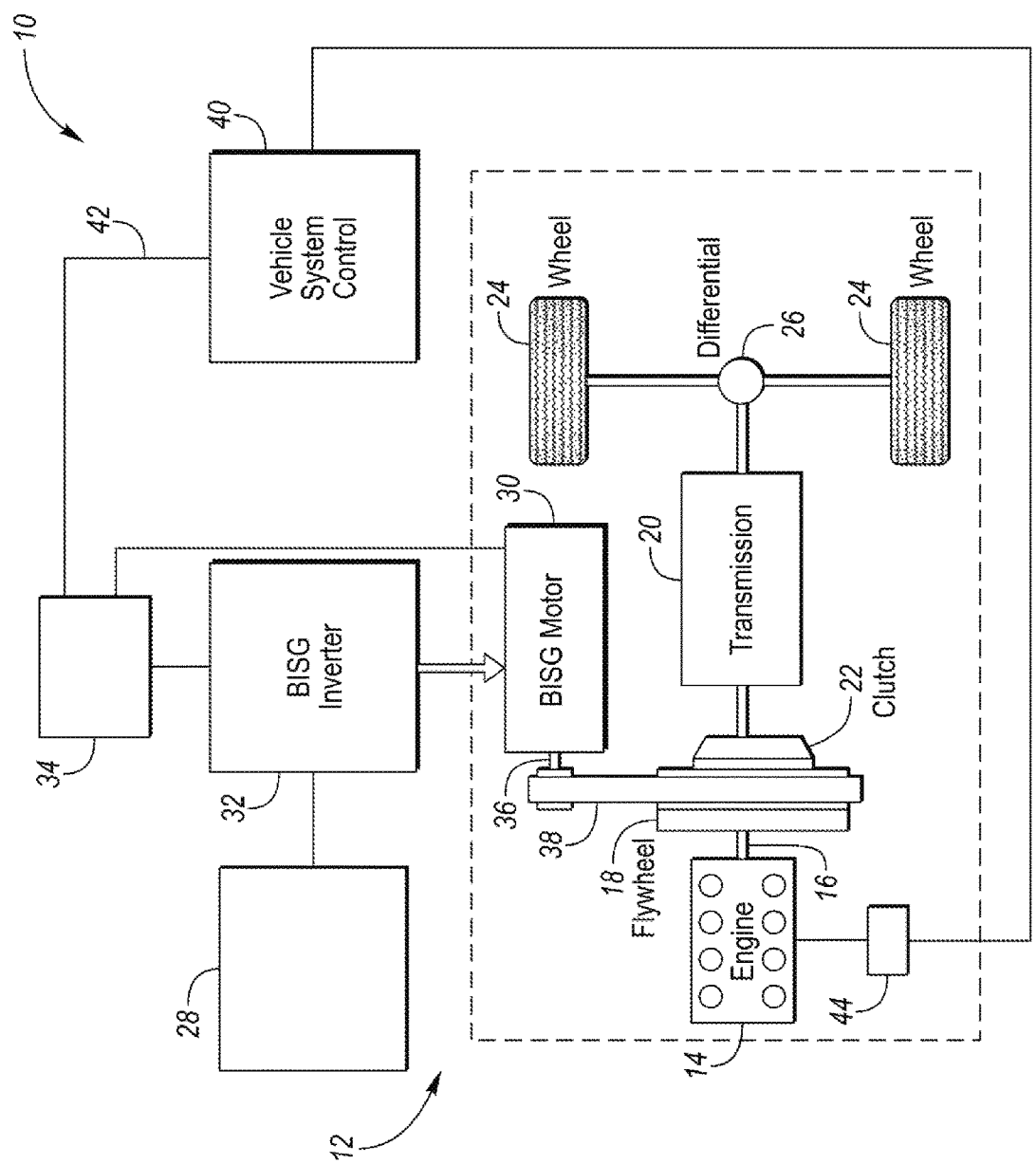
FIG. 1 is simplified block diagram of one non-limiting exemplary embodiment of a system for notification of an active short circuit condition in an electric motor of a hybrid electric vehicle including a traction battery according to the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components, elements, features, items, members, parts, portions, or the like. Therefore, specific structural and functional details disclosed herein are not to be interpreted as limiting, but merely as a representative basis for teaching one skilled in the art.

With reference to the Figures, a more detailed description will be provided of non-limiting exemplary embodiments of a method and system for notification of an active short circuit condition in an electric motor of a hybrid electric vehicle including a traction battery. For ease of illustration and to facilitate understanding, like reference numerals have been used herein for like components and features throughout the drawings.

Referring now to FIG. 1, a simplified block diagram of one non-limiting exemplary embodiment of a system 10 for notification of an active short circuit condition in an electric motor of a hybrid electric vehicle including a traction battery according to the present disclosure is shown. As seen therein, an HEV 12 may include an internal combustion engine (ICE) 14 having a shaft 16. The shaft 16 of the ICE 14 may be provided in mechanical communication with a flywheel 18, which in turn may be provided in mechanical communication with a vehicle transmission 20 through a clutch 22. The transmission 20 may be provided for driving drive wheels 24 through a differential 26.

The HEV 12 may also include a high-voltage (HV) direct current (DC) traction battery 28 and a Belt-integrated Starter Generator (BiSG) system. The BiSG system may comprise an electric motor 30, an inverter 32, and an inverter controller 34. The electric motor 30 may include a shaft 36 which may be configured for mechanical communication with the shaft 16 of the ICE 14 through a belt 38. The electric motor 30 may be further provided in electrical communication with the inverter 32, which itself may be provided in electrical communication with the inverter controller 34 and the HV DC traction battery 28. The inverter 32 may comprise multiple switches, such as Insulated-Gate Bipolar Transistors (IGBTs), which can be controlled to convert direct current (DC) supplied by the HV DC traction batter 28 into three-phase alternating current (AC) for powering the electric motor 30, or to convert three-phase AC generated by the electric motor 30 into DC for charging the HV DC traction battery 28. The inverter controller 34 may also be provided in electrical communication with vehicle system control, such as a vehicle controller 40. In that regard, electrical communication between the inverter controller 34 and the vehicle controller 40 may be provided over any suitable type of vehicle bus 42, such as a Flexray bus.

The BiSG system may be configured for operation in a motoring mode in which the inverter controller 34 may control the inverter 32 to operate the electric motor 30 as a starter to assist engine start during cranking of the ICE 14. In such a motoring mode, the inverter controller 34 may alternatively control the inverter 32 to operate the electric motor 30 to drive the vehicle propulsion system, including the vehicle transmission 20 and drive wheels 24. More specifically, in the motoring mode, the inverter controller 34 may be configured to generate driver signals to operate the switches of the inverter 32 to convert direct current (DC) received from the HV DC traction battery 28 into three-phase alternating current (AC) for powering the electric motor 30 to drive the vehicle propulsion system, including the vehicle transmission 20 and drive wheels 24.

The BiSG system may also be configured for operation in a generating mode in which the inverter controller 34 may control the inverter 32 to operate the electric motor 30 as a charger to provide DC current to the HV DC traction battery 28. More specifically, in the generating mode, the inverter controller 34 may be configured to generate driver signals to operate the switches of the inverter 32 to convert three-phase alternating current (AC) received from the electric motor 30 operating as a generator into direct current (DC) for charging the HV DC traction battery 28.

In that regard, an active short circuit condition may be utilized as a safety method to prevent the HV DC traction battery 28 from being damaged due to overcharging. More specifically, the inverter controller 34 may be configured to produce an active short circuit in the electric motor 30 when the speed of the electric motor 30 becomes high enough to allow free-wheeling current flowing from the electric motor 30 to the HV DC traction battery 28.

However, an active short circuit condition generates electric current circulating between the windings (not shown) of the electric motor 30 and the IGBT switches (not shown) of the inverter 32. If the electric motor 30 continues to rotate, such circulating current will eventually cause damage to the electric motor 30 and the IGBT switches of the inverter 32 due to overheating.

As previously noted, a need exists for a method and system for notification of an active short circuit condition in an electric motor of an HEV including a HV DC traction battery. Such a method and system would inform or notify a vehicle controller of the active short circuit condition, the vehicle controller configured to generate an engine stop control signal in response to receipt of the active short circuit notification to stop the internal combustion engine and thereby reduce circulation of electric current between the inverter and the electric motor caused by the active short circuit condition.

Still referring to FIG. 1, the system 10 of the present disclosure is provided for notification of an active short circuit condition in the electric motor 30 of the HEV 12 that includes HV DC traction battery 28, ICE 14 in mechanical communication with the electric motor 30, and a vehicle propulsion system, including transmission 20 and drive wheels 24, configured to be driven by the electric motor 30 or ICE 14. As seen therein, the system 10 may comprise an inverter 32 which may comprise a plurality of switches (not shown), such as Insulated-Gate Bipolar Transistors (IGBTs). The inverter 32 may be configured to be provided in electrical communication with the electric motor 30 and the HV DC traction battery 28. The system 10 may further comprise inverter controller 34, which may be configured to be provided in electrical communication with the inverter 32 and to generate driver signals to operate the plurality of switches of the inverter 32 to produce three-phase alternating current (AC) for the electric motor 30 to drive the vehicle propulsion system or to generate driver signals to operate the plurality of switches of the inverter 32 to produce direct current (DC) for charging the HV DC traction battery 28.

The inverter controller 34 may be configured to monitor a speed of the electric motor 30 and/or compare the monitored speed of the electric motor 30 to a speed threshold. In response to the monitored speed exceeding the threshold, the inverter controller 34 may be further configured to generate driver signals to operate the plurality of switches of the inverter 32 to produce an active short circuit condition in the electric motor 30 to prevent overcharging of the traction battery 28. In that regard, inverter 32 may comprise a three-phase inverter, and the inverter controller 34 may be configured to generate driver signals wherein three low side switches, e.g., IGBTs, of the three-phase inverter 32 are turned ON and three high side switches, e.g., IGBTs, of the three-phase inverter 32 are turned OFF. In response to an active short circuit condition in the electric motor 30, the inverter controller 34 may be further configured to transmit an active short circuit notification signal to a vehicle controller 40 configured to generate an engine stop control signal operative to stop the ICE 14 and thereby reduce circulation of electric current between the inverter 32 and the electric motor 30 caused by the active short circuit condition.

In that regard, as described previously, the electric motor 30 may comprise a motor shaft 36 configured for mechanical communication with the shaft 16 of the ICE 14 through the belt 38. By virtue of the mechanical connection of the ICE 14 and the electric motor 30 through the belt 38, stopping the ICE 14 can also acts to stop rotation of the electric motor 30, thereby reducing circulation of electric current between the inverter 32 and the electric motor 30 caused by the active short circuit condition if the electric motor 30 were to continue rotating. The system 10 may further comprise the vehicle controller 40, which may be provided in electrical communication with an engine controller 44, which may be configured to stop the ICE 14 in response to receipt of the engine stop control signal from the vehicle controller 40.

It should also be noted that the vehicle controller 40 may be configured to generate the engine stop control signal operative to stop the ICE 14 immediately upon receipt of the active short circuit notification signal from the inverter controller 34. Alternatively, the vehicle controller 40 may be configured to generate the engine stop control signal operative to stop the ICE 14 a predetermined period of time (Active Short Circuit Time ($T_{asc}$)) after receipt of the active short circuit notification signal. The predetermined period of time ($T_{asc}$) should be as short as possible and may be based on one or more parameters which may comprise a traction battery parameter, an electric motor parameter, and/or an inverter parameter. More specifically, the predetermined period of time ($T_{asc}$) may be based on one or more parameters which may comprise a determined or detected resistance of the windings of the electric motor 30, a detected or monitored speed of the electric motor 30, a back electromotive force (BEMF) constant of the electric motor 30 determined by or based on the specific design of the electric motor 30, and/or inverter IGBT parameters such as energy loss including switching and conduction loss. The predetermined period of time ($T_{asc}$) may be controlled, set, or selected to reduce, eliminate, or avoid overheating of the windings and/or the magnet of the electric motor 30 and/or components of the inverter 34 such as the IGBTs. In that regard, a temperature of the motor windings and/or magnet may be determined, monitored, and/or detected, such as by one or more temperature sensors.

Moreover, the motor speed threshold to which the inverter controller 34 compares the monitored speed of the electric motor 30 may be a fixed value. Alternatively, the motor speed threshold may comprise a variable speed threshold, which may be proportional to a voltage of the traction battery 28. In that regard, such a variable speed threshold is described in detail in co-pending U.S. patent application Ser. No. 16/778,842, entitled "Method And System For Producing An Active Short Circuit Condition In An Electric Motor Of A Hybrid Electric Vehicle", filed on Jan. 31, 2020, the disclosure of which is hereby incorporated herein by reference in its entirety.

Still further, the inverter controller 34 of the system 10 may comprise a processor and an electric circuit, wherein the processor and the electric circuit may each be configured to independently generate active short circuit control signals operative to effectuate generation of the driver signals to operate the plurality of switches of the inverter 32 to produce the active short circuit condition in the electric motor 30. In that regard, the active short circuit condition may be produced based on an active short circuit control signal generated by the electric circuit in the absence of an active short circuit control signal generated by the processor, which is described in detail in co-pending U.S. patent application Ser. No. 16/778,851, entitled "Method And System For Producing An Active Short Circuit Condition In An Electric Motor Of A Hybrid Electric Vehicle", filed on Jan. 31, 2020, the disclosure of which is hereby incorporated herein by reference in its entirety.

It should be noted that the inverter controller 34, the vehicle controller 40, the engine controller 44, and/or any other unit, module, controller, system, subsystem, mechanism, device, component or the like described herein may comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry), or several such processors and/or circuitry and/or hardware may be distributed among several separate units, modules, controllers, systems, subsystems, mechanisms, devices, components or the like, whether individually packaged or assembled into a SoC (System-on-a-Chip).

Figure 2:
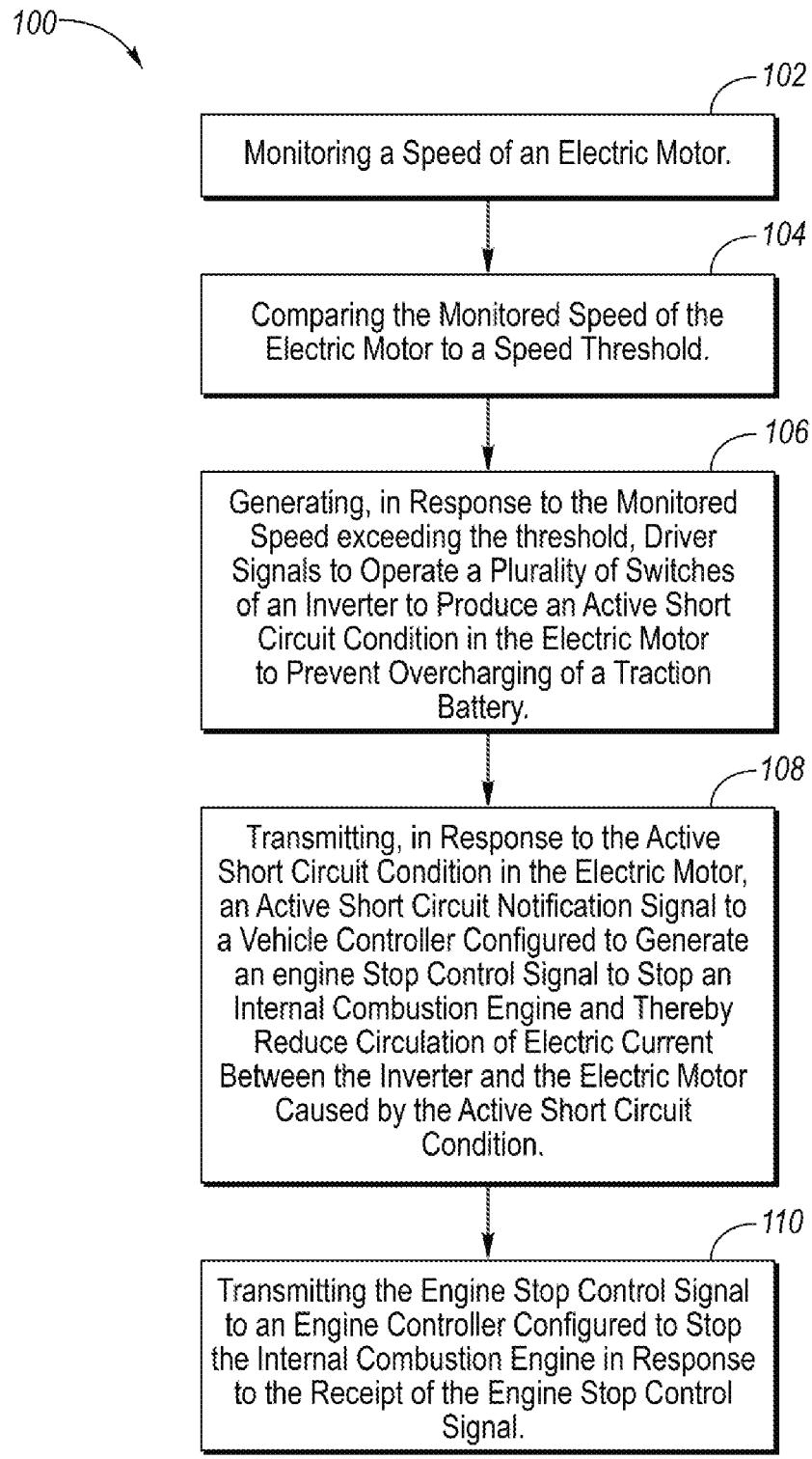
FIG. 2 is a simplified flowchart of one non-limiting exemplary embodiment of a method for notification of an active short circuit condition in an electric motor of a hybrid electric vehicle including a traction battery according to the present disclosure.

Referring next to FIG. 2, a simplified flowchart of one non-limiting exemplary embodiment of a method 100 for notification of an active short circuit condition in an electric motor of a hybrid electric vehicle including a traction battery according to the present disclosure is shown. As seen therein, and with continuing reference to FIG. 1, the method 100 is provided for notification of an active short circuit condition in an electric motor 30 of a HEV 12 including a traction battery 28, an ICE 14 in mechanical communication with the electric motor 30, a vehicle propulsion system configured to be driven by the electric motor 30 or the ICE 14, an inverter 32 having a plurality of switches in electrical communication with the electric motor 30 and the traction battery 28, and an inverter controller 34 in electrical communication with the inverter 32 and configured to generate driver signals to operate the plurality of switches of the inverter 32 to produce three-phase AC for the electric motor 30 to drive the vehicle propulsion system or to produce DC for charging the HV DC traction battery 28.

The method 100 may comprise monitoring 102, such as by the inverter controller 34, a speed of the electric motor 30. The method 100 may further comprise comparing 104, such as by the inverter controller 34, the monitored speed of the electric motor 30 to a speed threshold. The method 100 may further comprise generating 106, such as by the inverter controller 34, in response to the monitored speed exceeding the threshold, driver signals to operate the plurality of switches of the inverter 32 to produce an active short circuit condition in the electric motor 30 to prevent overcharging of the traction battery 28. The method 100 may still further comprise transmitting 108, such as by the inverter controller 34, in response to an active short circuit condition in the electric motor 30, an active short circuit notification signal to a vehicle controller 40 which may be configured to generate an engine stop control signal operative to stop the ICE 14 and thereby reduce circulation of electric current between the inverter 32 and the electric motor 30 caused by the active short circuit condition.

As previously described, the vehicle controller 40 may be configured to generate the engine stop control signal operative to stop the ICE 14 a predetermined period of time after receipt of the active short circuit notification signal. In that regard, the predetermined period of time may be based on one or more parameters, which may comprise a traction battery parameter, an electric motor parameter, and/or an inverter parameter. The method 100 may further comprise transmitting 110, such as by the vehicle controller 40, the engine stop control signal to an engine controller 44 which may be configured to stop the internal combustion engine 14 in response to receipt of the engine stop control signal from the vehicle controller 40.

In that regard, as previously described, the electric motor 30 may comprise a motor shaft 36 configured for mechanical communication with the shaft 16 of the internal combustion engine 14 through the belt 38. By virtue of the mechanical connection of the ICE 14 and the electric motor 30 through the belt 38, stopping the ICE 14 also acts to stop rotation of the electric motor 30, thereby reducing circulation of electric current between the inverter 32 and the electric motor 30 caused by the active short circuit condition if the electric motor 30 were to continue rotating.

Moreover, the motor speed threshold to which the inverter controller 34 compares the monitored speed of the electric motor 30 may be a fixed value. Alternatively, the motor speed threshold may comprise a variable speed threshold, which may be proportional to a voltage of the HV DC traction battery 28.

Still further, with continuing reference to FIGS. 1 and 2, the system 10 and method 100 of the present disclosure may be implemented utilizing a non-transitory computer readable storage medium having stored computer executable instructions for notification of an active short circuit condition in an electric motor 30 of an HEV 12 including an HV DC traction battery 28, an ICE 14 in mechanical communication with the electric motor 30, a vehicle propulsion system configured to be driven d by the electric motor 30 or the ICE 14, an inverter 32 having a plurality of switches in electrical communication with the electric motor 30 and the HV DC traction battery 28, and an inverter controller 34 in electrical communication with the inverter 32 and configured to generate driver signals to operate the plurality of switches of the inverter 32 to produce three-phase AC for the electric motor 30 to drive the vehicle propulsion system or to produce DC for charging the HV DC traction battery 28.

Execution of the stored computer executable instructions may cause the inverter controller 34 to monitor a speed of the electric motor 30 and/or compare the monitored speed of the electric motor 30 to an electric motor speed threshold. Execution of the stored computer executable instructions may further cause the inverter controller 34 to generate, in response to the monitored speed exceeding the threshold, driver signals to operate the plurality of switches of the inverter 32 to produce an active short circuit condition in the electric motor 30 to prevent overcharging of the HV DC traction battery 28, and transmit, in response to an active short circuit condition in the electric motor 30, an active short circuit notification signal to a vehicle controller 40 configured to generate an engine stop control signal operative to stop the ICE 14 and thereby reduce circulation of electric current between the inverter 32 and the electric motor 30 caused by the active short circuit condition.

Once again, as previously described, the vehicle controller 40 may be configured to generate the engine stop control signal operative to stop the ICE 14 a predetermined period of time after receipt of the active short circuit notification signal. In that regard, the predetermined period of time may be based on one or more parameters, which may comprise a traction battery parameter, an electric motor parameter, and/or an inverter parameter. As also previously described, the vehicle controller 40 may be provided in electrical communication with an engine controller 44 which may be configured to stop the ICE 14 in response to receipt of the engine stop control signal from the vehicle controller 40.

Still further, as also described previously, the electric motor 30 may comprise a motor shaft 36 configured for mechanical communication with a shaft 16 of the ICE 14 through a belt 38. Moreover, the motor speed threshold to which the inverter controller 34 compares the monitored speed of the electric motor 30 may be a fixed value. Alternatively, the motor speed threshold may comprise a variable speed threshold, which may be proportional to a voltage of the HV DC traction battery 28.

As is readily apparent from the foregoing, various non-limiting exemplary embodiments of a method and system for notification of an active short circuit condition in an electric motor of an HEV including a HV DC traction battery have been described. Such a method and system inform or notify a vehicle controller of the active short circuit condition, the vehicle controller configured to generate an engine stop control signal after receipt of the active short circuit notification to stop the internal combustion engine and thereby reduce circulation of electric current between the inverter and the electric motor caused by the active short circuit condition.

While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A method for notification of an active short circuit condition in an electric motor of a hybrid electric vehicle including a traction battery, an internal combustion engine in mechanical communication with the electric motor, a vehicle propulsion system configured to be powered by the electric motor or the internal combustion engine, an inverter having a plurality of switches in electrical communication with the electric motor and the traction battery, and an inverter controller in electrical communication with the inverter and configured to generate driver signals to operate the plurality of switches of the inverter to produce three-phase alternating current for the electric motor to drive the vehicle propulsion system or to produce direct current for charging the traction battery, the method comprising:
    comparing a monitored speed of the electric motor to a speed threshold;
    generating, in response to the monitored speed exceeding the threshold, driver signals to operate the plurality of switches to produce an active short circuit condition in the electric motor to prevent overcharging of the traction battery; and
    transmitting, in response to an active short circuit condition in the electric motor, an active short circuit notification signal to a vehicle controller configured to generate an engine stop control signal in response to receipt of the active short circuit notification signal operative to stop the internal combustion engine and thereby reduce circulation of electric current between the inverter and the electric motor caused by the active short circuit condition.

2. The method of claim 1 wherein the vehicle controller is configured to generate the engine stop control signal a predetermined period of time after receipt of the active short circuit notification signal, and wherein the predetermined period of time is based on a plurality of parameters comprising an electric motor parameter and an inverter parameter.

3. The method of claim 1 further comprising transmitting, by the vehicle controller, the engine stop control signal to an engine controller configured to stop the internal combustion engine in response to receipt of the engine stop control signal from the vehicle controller.

4. The method of claim 1 wherein the electric motor comprises a motor shaft configured for mechanical communication with a shaft of the internal combustion engine through a belt.

5. The method of claim 1 wherein the speed threshold comprises a variable speed threshold proportional to a voltage of the traction battery.

6. The method of claim 1 wherein comparing the monitored speed of the electric motor to a speed threshold, generating the driver signals, and transmitting the active short circuit notification signal are performed by the inverter controller.

7. A system for notification of an active short circuit condition in an electric motor of a hybrid electric vehicle including a traction battery, an internal combustion engine in mechanical communication with the electric motor, and a vehicle propulsion system configured to be driven by the electric motor or the internal combustion engine, the system comprising:
    an inverter comprising a plurality of switches, wherein the inverter is configured to be provided in electrical communication with the electric motor and the traction battery; and
    an inverter controller configured to be provided in electrical communication with the inverter and to generate driver signals to operate the plurality of switches of the inverter to produce three-phase alternating current for the electric motor to drive the vehicle propulsion system or to produce direct current for charging the traction battery;
    wherein the inverter controller is configured to compare a monitored speed of the electric motor to a speed threshold, and in response to the monitored speed exceeding the threshold, generate driver signals to operate the plurality of switches to produce an active short circuit condition in the electric motor to prevent overcharging of the traction battery;
    wherein, in response to an active short circuit condition in the electric motor, the inverter controller is further configured to transmit an active short circuit notification signal to a vehicle controller configured to generate an engine stop control signal operative to stop the internal combustion engine and thereby reduce circulation of electric current between the inverter and the electric motor caused by the active short circuit condition.

8. The system of claim 7 wherein the vehicle controller is configured to generate the engine stop control signal a predetermined period of time after receipt of the active short circuit notification signal, and wherein the predetermined period of time is based on a plurality of parameters comprising an electric motor parameter and an inverter parameter.

9. The system of claim 7 further comprising the vehicle controller.

10. The system of claim 7 wherein the vehicle controller is provided in electrical communication with an engine controller configured to stop the internal combustion engine in response to receipt of the engine stop control signal from the vehicle controller.

11. The system of claim 7 wherein the electric motor comprises a motor shaft configured for mechanical communication with a shaft of the internal combustion engine through a belt.

12. The system of claim 7 wherein the speed threshold comprises a variable speed threshold.

13. The system of claim 12 wherein the variable speed threshold is proportional to a voltage of the traction battery.

14. The system of claim 7 wherein the inverter controller comprises a processor and an electric circuit, wherein the processor and the electric circuit are each configured to independently generate active short circuit control signals operative to effectuate generation of the driver signals to operate the plurality of switches of the inverter to produce the active short circuit condition in the electric motor, and wherein and the active short circuit condition is produced based on an active short circuit control signal generated by the electric circuit in the absence of an active short circuit control signal generated by the processor.

15. A non-transitory computer readable storage medium having stored computer executable instructions for notification of an active short circuit condition in an electric motor of a hybrid electric vehicle including a traction battery, an internal combustion engine in mechanical communication with the electric motor, a vehicle propulsion system configured to be driven by the electric motor or the internal combustion engine, an inverter having a plurality of switches in electrical communication with the electric motor and the traction battery, and an inverter controller in electrical communication with the inverter and configured to generate driver signals to operate the plurality of switches of the inverter to produce three-phase alternating current for the electric motor to drive the vehicle propulsion system or to produce direct current for charging the traction battery, wherein execution of the instructions causes the inverter controller to:

compare a monitored speed of the electric motor to a speed threshold;

generate, in response to the monitored speed exceeding the threshold, driver signals to operate the plurality of switches to produce an active short circuit condition in the electric motor to prevent overcharging of the traction battery; and transmit, in response to an active short circuit condition in the electric motor, an active short circuit notification signal to a vehicle controller configured to generate an engine stop control signal operative to stop the internal combustion engine and thereby reduce circulation of electric current between the inverter and the electric motor caused by the active short circuit condition.

16. The non-transitory computer readable storage medium of claim 15 wherein the vehicle controller is configured to generate the control signal a predetermined period of time after receipt of the active short circuit notification signal, and wherein the predetermined period of time is based on a plurality of parameters comprising an electric motor parameter and an inverter parameter.

17. The non-transitory computer readable storage medium of claim 15 wherein the vehicle controller is provided in electrical communication with an engine controller configured to stop the internal combustion engine in response to receipt of the engine stop control signal from the vehicle controller.

18. The non-transitory computer readable storage medium of claim 15 wherein the electric motor comprises a motor shaft configured for mechanical communication with a shaft of the internal combustion engine through a belt.

19. The non-transitory computer readable storage medium of claim 15 wherein the speed threshold comprises a variable speed threshold.

20. The non-transitory computer readable storage medium of claim 19 wherein the variable speed threshold is proportional to a voltage of the traction battery.

* * * * *